United States Patent
Ahn

(10) Patent No.: US 10,460,713 B2
(45) Date of Patent: Oct. 29, 2019

(54) ACOUSTIC WAVE CLOAKING METHOD AND DEVICE CONSIDERING GENERALIZED TIME DEPENDENCY

(71) Applicant: University of Seoul Industry Cooperation Foundation, Seoul (KR)

(72) Inventor: Do Yeol Ahn, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 318 days.

(21) Appl. No.: 15/383,824

(22) Filed: Dec. 19, 2016

(65) Prior Publication Data

US 2017/0098440 A1 Apr. 6, 2017

Related U.S. Application Data

(63) Continuation of application No. PCT/KR2015/009105, filed on Aug. 31, 2015.

(30) Foreign Application Priority Data

Aug. 29, 2014 (KR) .................. 10-2014-0113825

(51) Int. Cl.
*G10K 11/162* (2006.01)
*G06F 17/11* (2006.01)
(Continued)

(52) U.S. Cl.
CPC ............ *G10K 11/162* (2013.01); *G06F 17/11* (2013.01); *G06F 17/16* (2013.01); *G10K 15/00* (2013.01)

(58) Field of Classification Search
CPC ...... G10K 11/162; G10K 15/00; G06F 17/11; G06F 17/16
See application file for complete search history.

(56) References Cited

U.S. PATENT DOCUMENTS

| 8,172,036 B2 | 5/2012 | Tanielian |
| 9,677,856 B2 * | 6/2017 | Pendry ...................... F41H 3/00 |
| 2018/0031354 A1 * | 2/2018 | Pendry ...................... F41H 3/00 |

FOREIGN PATENT DOCUMENTS

| JP | 2013-545119 A | 12/2013 |
| KR | 10-2012-0068571 | 6/2012 |

(Continued)

OTHER PUBLICATIONS

Leonhardt, U., "Optical Conformal Mapping", Science, 312 (2006) 1777.

(Continued)

*Primary Examiner* — Jeremy A Luks
(74) *Attorney, Agent, or Firm* — Mintz Levin Cohn Ferris Glovsky and Popeo, P.C.; Kongsik Kim; Jhongwoo Jay Peck

(57) ABSTRACT

Disclosed herein are a method and device for cloaking an acoustic wave. A method for cloaking an acoustic wave according to an embodiment of the present invention includes: transforming an acoustic propagation mathematical model, predetermined for the propagation of an acoustic wave, into an acoustic wave cloaking mathematical model corresponding to an electromagnetic wave mathematical model predetermined for an electromagnetic wave and including a time variable for time dependency, based on a correlation between the acoustic propagation mathematical model and the electromagnetic wave mathematical model; obtaining a target characteristic of a meta-material by using the acoustic wave cloaking mathematical model; and blocking a region including a target object, from an acoustic wave by disposing the meta-material having the obtained target characteristic to surround the region.

8 Claims, 6 Drawing Sheets

(51) Int. Cl.
*G06F 17/16* (2006.01)
*G10K 15/00* (2006.01)

(56) References Cited

FOREIGN PATENT DOCUMENTS

KR   10-2013-0047860 A   5/2013
KR   10-2015-0086943 A   7/2015

OTHER PUBLICATIONS

Pendry, J.B. et al., "Controlling Electromagnetic Fields", Science, 312 (2006) 1780.
Lai, Y. et al., "Complementary media invisibility cloak that cloaks objects at a distance outside the cloaking shell", Phys. Rev. Lettt., 102(9): 093901 (Mar. 6, 2009), 13 pages.
Ahn, Doyeol "Calculation of permittivity tensors for invisibility devices by effective medium approach in general relativity", Jrl. of Modern Optics, vol. 58, Issue 8, 2011 (41 pages).
Urzhumov, Y. et al., Acoustic cloaking transformations from attainable material properties, New Jrl. of Physics, 12 (2010) 22 pages.
"Implementation of surface acoustic waves using material (p—NG) having negative density", published online Jun. 25, 2013 by Yonsei University, <http://www.ndsl.kr/ndsl/search/detail/report/reportSearchResultDetail.do?cn=TRKO201300034100>.

\* cited by examiner

ACOUSTIC WAVE CLOAKING METHOD AND DEVICE CONSIDERING GENERALIZED TIME DEPENDENCY

CROSS-REFERENCE TO RELATED APPLICATION

This application is a continuation of PCT/KR2015/009105 filed on Aug. 31, 2015, which claims priority to Korean Application No. 10-2014-0113825 filed on Aug. 29, 2014, which application is incorporated herein by reference.

TECHNICAL FIELD

The present invention relates generally to a meta-material, and more particularly to a method and device that are capable of, by using a meta-material, preventing an acoustic wave having generalized time dependency from propagating to a specific region and also preventing an acoustic wave of a specific object having generalized time dependency from propagating to the outside.

BACKGROUND ART

Recent research into meta-materials has enabled microscopic control and macroscopic control for an electromagnetic field (see Phys. Rev. Lett. 85, 3966 (2000); Science 312, 1777 (2006); Science 312, 1780 (2006)). A meta-material is a material in which an electromagnetic characteristic that cannot be realized in a general natural state is realized using an artificial method. A meta-material is characterized in that it has a negative refractive index, and thus light is bent in the direction, opposite to a direction in which the light is bent in a normal material, in the meta-material.

A scheme for freely adjusting the direction of an electromagnetic field regardless of the source of the electromagnetic field and also providing guidance while avoiding an object as if there was no object by using such a meta-material was proposed (see Science 312, 1777 (2006); Science 312, 1780 (2006)). This scheme can be potentially applied to radiation shielding from a strong electromagnetic pulse (EMP) or electromagnetic energy having directionality.

Electromagnetic field control using a meta-material is attracting increasing attention in the fields of novel applications, such as an invisibility cloak, a concentrator, and a refractor.

Among these applications, an invisibility cloak is intended to hide an object inside a given geometrical shape, and is the most attractive application. An invisibility cloak is based on the coordinate transformation and conformal mapping of Maxwell's equations, and such invisibility cloaks were independently proposed by Pentry (see Science 312, 1780 (2006)) and Leonhardt (see Science 312, 1777 (2006)).

A full wave electromagnetic simulation of a cylindrical cloak using ideal or non-ideal electromagnetic parameters has been researched, and the experimental implementation of a cylindrical cloak having simple parameters, which operates at a microwave frequency, was announced.

In the analysis and design of an invisibility device, it is most important to calculate permittivity and permeability tensors for a meta-material that constitutes a cloaking shell.

It is assumed that an invisibility device distorts field lines so that the field lines move while avoiding any area having uniform field lines in the corresponding area. This distortion may be considered to be coordinate transformation between an original Cartesian mesh and a distortion mesh.

The theory and experimental implementation of the conventional invisibility device is significantly influenced by the propagation direction of an electromagnetic wave, polarized light, and a wavelength band. Although a technology for improving the efficiency of an invisibility device by using complementary media was proposed in the paper "Complementary media invisibility cloak that cloaks objects at a distance outside the cloaking shell," Y. Lai, H. Chen, Z. Q. Zhang, and C. Chan, Phys. Rev. Lett. 102, 93901 (2009) (published on May 2, 2009), this preceding technology self-proclaims that it is valid only at finite frequencies.

Attempts to overcome this limitation and extend the preceding technology to a theory that is applicable to more general cases were introduced in the paper "Calculation of Permittivity Tensors for Invisibility Devices by Effective Media Approach in General Relativity", Doyeol Ahn, Journal of Modern Optics, Volume 58, Issue 8, 2011 (published on Apr. 4, 2011) and Korean Patent Application Publication No. 10-2013-0047860 (published on May 9, 2013).

In the approaches of the preceding technologies, permittivity and permeability tensors may be scaled using factors obtained via coordinate transformation or optical conformal mapping technology while maintaining the forms of Maxwell's equations that do not change in any coordinate system.

Furthermore, a method for calculating permittivity and permeability tensors for an invisibility device by using electrodynamics in the frame of the theory of relativity was researched.

The principle idea of this preceding technology is based on the fact that in curved space-time, the propagation of an electromagnetic wave appears as wave travelling in an inhomogeneous effective bi-anisotropic media. The constitutive parameters thereof are determined by a space-time metric.

This technology can express the inverse problem of transformation into any curved space-time in a media inside flat space-time, and can find specific conditions for invisibility cloaking.

The above-described preceding technologies relate to invisibility techniques in which a cloaking target is limited to an electromagnetic wave. There is no embodied preceding technology in which a cloaking target is an acoustic wave.

SUMMARY OF THE DISCLOSURE

Accordingly, the present invention has been made to overcome the problems of the preceding technologies, and an object of the present invention is to provide a method and device for cloaking an acoustic wave, which are capable of, by using a meta-material, blocking a specific region from an acoustic wave having generalized time dependency, excluding a specific region from the path of an acoustic wave, or preventing an acoustic wave, generated by a specific object and having generalized time dependency, from propagating to the outside.

An object of the present invention is to provide a method and device for cloaking an acoustic wave, which are capable of blocking or cloaking an acoustic wave even when a cloaking target region has any one of various geometrical shapes.

An object of the present invention is to provide a method and device that are capable of cloaking a specific region from an acoustic wave having time dependency regardless of factors, such as the frequency and velocity of the acoustic wave.

According to an aspect of the present invention, there is provided a method of cloaking an acoustic wave, including: transforming an acoustic propagation mathematical model, predetermined for the propagation of an acoustic wave, into an acoustic wave cloaking mathematical model corresponding to an electromagnetic wave mathematical model predetermined for an electromagnetic wave and including a time variable for time dependency, based on a correlation between the acoustic propagation mathematical model and the electromagnetic wave mathematical model; obtaining a target characteristic of a meta-material by using the acoustic wave cloaking mathematical model; and blocking a region including a target object, from an acoustic wave by disposing the meta-material having the obtained target characteristic to surround the region.

The transforming may include obtaining a one-to-one correspondence between the acoustic propagation parameters of the acoustic propagation mathematical model and the electromagnetic wave parameters of the electromagnetic wave mathematical model, and transforming the acoustic propagation mathematical model into the acoustic wave cloaking mathematical model by using the one-to-one correspondence between the acoustic propagation parameters and the electromagnetic wave parameters The electromagnetic wave mathematical model may include a Maxwell's equations-based mathematical model; and the transforming may include transforming the acoustic propagation mathematical model into the acoustic wave cloaking mathematical model by applying the acoustic propagation mathematical model into a Maxwell's equations-based relativistic coordinate-space transformation method.

The acoustic wave cloaking mathematical model may be a mathematical model that is applicable to all coordinate systems including an elliptic coordinate system, a bipolar coordinate system, a Cartesian coordinate system, a cylindrical coordinate system, and a spherical coordinate system.

According to another aspect of the present invention, there is provided a device for clocking an acoustic wave by using a meta-material, wherein: the meta-material has a target characteristic obtained using a predetermined acoustic wave cloaking mathematical model, and is disposed to surround a region including a target object to be blocked from an acoustic wave; and the acoustic wave cloaking mathematical model is determined through the transformation of an acoustic propagation mathematical model predetermined for the propagation of an acoustic wave in accordance with an electromagnetic wave mathematical model predetermined for an electromagnetic wave based on a correlation between the acoustic propagation mathematical model and the electromagnetic wave mathematical model, and includes a time variable for time dependency.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Figure 1:
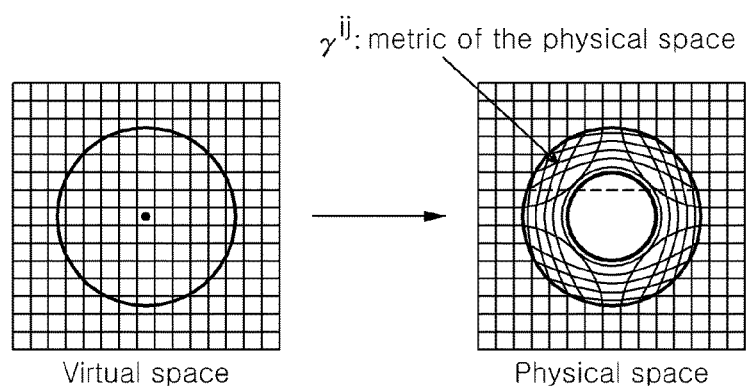
FIG. 1 shows an example of an invisibility cloak based on a space-time meta-material analysis method using the theory of general relativity.

Embodiments of the present invention will be described in detail with reference to the accompanying drawings. In the following description of the present invention, a detailed description of a related well-known component or function will be omitted when it is determined that the detailed description may make the gist of the present invention obscure.

The prevent invention is not limited to the embodiments. Throughout the accompanying drawings, the same reference symbols designate the same components.

A method and device for cloaking an acoustic wave according to embodiments of the present invention will be described in detail below with reference to FIGS. 1 to 6.

The term "meta-material" used herein is defined as follows. That is, the term "meta-material" is used to refer to a material the permittivity, permeability, density and modulus tensors of which can be artificially controlled or designed, or is used to refer to a material which is obtained as a result of the control or design.

An invisibility device is based on a theoretical basis in which when Maxwell's equations are established in space-time having finite curvature, the curvature of the space-time acts like permittivity and permeability with respect to electric and magnetic fields.

More specifically, in the theory of general relativity, covariant Maxwell's equations may be expressed by Equation 1 below:

$$F^{\mu\nu};\mu = \frac{\varepsilon_0}{\sqrt{-g}} \frac{\partial}{\partial x^\mu}\left(\sqrt{-g}\, F^{\mu\nu}\right) = -J^\nu \qquad (1)$$

$$F_{\mu\nu;\lambda} + F_{\lambda\mu;\nu} + F_{\nu\lambda;\mu} = 0$$

where the subscript ";" is a covariant derivative, $\varepsilon_0$ is permittivity in free space, and $\mu$, $\nu$ and $\lambda$ are respective components of 4D coordinate space in an arbitrary 4D coordinate system.

Furthermore, g is the determinant of metric tensor $g_{\mu\nu}$, J is current density, and $F_{\mu\nu}$ is an electromagnetic field tensor.

The process of deriving Equation 1 is disclosed in Korean Patent Application Publication No. 10-2013-0047860 (published on May 9, 2013) and the paper "Calculation of permittivity tensors for invisibility devices by effective media approach in general relativity", Doyeol Ahn, Journal of Modern Optics, Volume 58, Issue 8, 2011 (published on Apr. 1, 2011). Furthermore, processes of deriving the following plurality of equations are disclosed in the above-described preceding technology documents. Accordingly, in the present specification, brief descriptions will be given with a focus on principal items, adopted in the present invention, within the range in which the gist of the present invention is not made obscure.

In this case, the electromagnetic field tensor may be expressed by Equation 2 below. The electromagnetic field tensor is described in the form of a matrix of a zero dimension (time) and the three dimensions of space in the theory of general relativity.

$$F_{\mu\nu} = \begin{pmatrix} 0 & -E_x & -E_y & -E_z \\ E_x & 0 & B_z & -B_y \\ E_y & -B_z & 0 & B_x \\ E_z & B_y & -B_x & 0 \end{pmatrix} \quad (2)$$

where E is an electric field, x, y and z are directions, and B is electric flux.

Furthermore, contra-variant tensor $H^{\mu\nu}$ may be expressed by Equation 3 below, and Equation 3 may be defined by Equation 4 below:

$$H^{\mu\nu} = \varepsilon_0 \frac{\sqrt{-g}}{2}(g^{\mu\lambda}g^{\nu\rho} - g^{\mu\rho}g^{\nu\lambda})F_{\lambda\rho} \quad (3)$$

$$H^{\mu\nu} = \begin{pmatrix} 0 & D_x & D_y & D_z \\ -D_x & 0 & H_z & -H_y \\ -D_y & -H_z & 0 & H_x \\ -D_z & H_y & -H_x & 0 \end{pmatrix} \quad (4)$$

where H is a magnetic field, and D is magnetic flux.

When the above-described equations are rearranged, the relations of Equations 5 and 6 are obtained below:

$$D_i = (-g)^{1/2}\varepsilon_0(g^{0j}g^{i0} - g^{00}g^{ij})E_j + (-g)^{1/2}[jkl]g^{0k}g^{jl}\mu_0^{-1}B_j \quad (5)$$

$$H_i = \frac{1}{\sqrt{-g}}[jkl]g_{0k}g_{il}\varepsilon_0 E_j - \frac{1}{\sqrt{-g}}(g_{i0}g_{j0} - g_{00}g_{ij})\mu_0^{-1}B_j \quad (6)$$

where [ijk] is an anti-symmetric permutation symbol and is defined as [xyz]=1, $\mu_0$ is permeability in free space, $g^{ab}$ is the (a, b) component of a contra-variant metric tensor, and $g_{cd}$ is the (c, d) component of a covariant metric tensor.

From the above-described equations, it can be seen that Maxwell's equations in a vacuum having a finite radius of curvature may be interpreted as Maxwell's equations in a media having finite permittivity and permeability.

FIG. 1 shows an example of an invisibility cloak based on a space-time meta-material analysis method using the theory of general relativity. An empty space at the center of physical space refers to a space that is used to hide a given object.

Furthermore, virtual space refers to space that is obtained by transforming the empty space of the physical space into a center point. Based on this relationship, an intuitive picture of the invisibility cloak may be generated using the physical space and the virtual space, in which actual invisibility cloaking is implemented, and coordinate transformation between these two spaces. The coordinate transformation between these two spaces may be described using metric tensor $g_{\mu\nu}$ in space-time. When a metric tensor indicative of curvilinear coordinates in physical space is defined as $\gamma'_{ij}$, a transformation equation between the two spaces is given as Equation 7 below, the permittivity tensor $\varepsilon^{ij}$ and permeability tensor $\mu^{ij}$ of the physical space that are implemented using a meta-material may be expressed by Equation 8 below:

$$g^{ij} = \frac{\partial x^i}{\partial x'^k}\frac{\partial x^j}{\partial x'^l}\gamma'^{kl} \quad (7)$$

$$\varepsilon^{ij} = \pm \frac{(\det(-g))^{1/2}}{\sqrt{\det(\gamma)}}(g^{0j}g^{i0} - g^{00}g^{ij}), \quad (8)$$

$$(\mu^{-1})_{ij} = \pm \frac{\sqrt{\det(\gamma)}}{\sqrt{\det(-g)}}(g_{i0}g_{j0} - g_{00}g_{ij})$$

where $\gamma$ is $\gamma_{ij}$, and $\gamma^{kk}=1/\gamma_{kk}$.

However, the invisibility cloak implemented using the above-described method has a disadvantage in that when an electromagnetic wave is polarized in a specific direction, the efficiency of invisibility is maximized.

The gist of the present invention lies in that an acoustic wave cloaking mathematical model adapted to block an acoustic wave in a specific band or to make an acoustic wave in a specific band invisible is derived from a mathematical model for the propagation of an acoustic wave by using the content of the papers by J. Mod. Opt. 58, 700-710 (2011), Journal of the Korean Physical Society 60, 1349-1360 (2012), JOSA B 30, 140-148 (2013), which is disclosed by the inventor of the present invention, and also using the Maxwell's equations-based relativistic coordinate-space transformation method used for a invisibility cloak for an electromagnetic wave in the paper of the inventor of the present invention, and the target characteristic of a meta-material adapted to block the acoustic wave in the specific band is obtained by using the derived acoustic wave cloaking mathematical model, thereby making a specific region invisible from the acoustic wave in the specific band or preventing the acoustic wave from propagating to a specific area.

In the present invention, an electromagnetic wave mathematical model including Maxwell's equations and an acoustic propagation mathematical model for the propagation of an acoustic wave are mathematical models having generalized time dependency, and thus the acoustic wave cloaking mathematical model according to the present invention is also a mathematical model having generalized time dependency. Accordingly, the present invention may be applied to an acoustic wave cloaking target region having any geometrical shape that is applied to one or more of all coordinate systems including an elliptic coordinate system, a bipolar coordinate system, a Cartesian coordinate system, a cylindrical coordinate system, a spherical coordinate system, etc.

Figure 2:
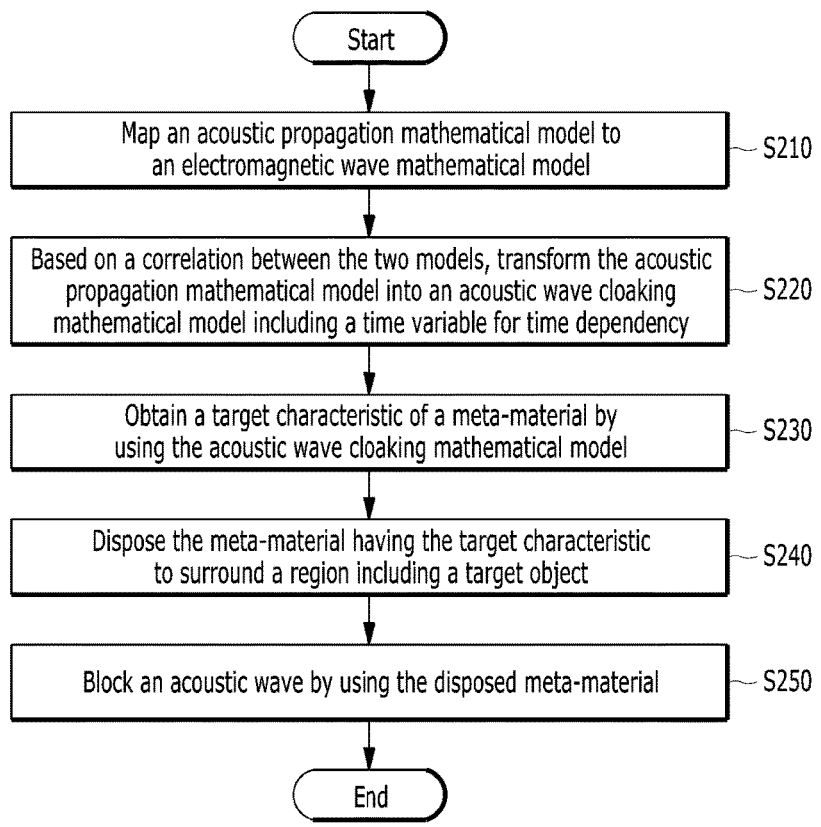
FIG. 2 is an operation flowchart showing a method of cloaking an acoustic wave according to an embodiment of the present invention.

FIG. 2 is an operation flowchart showing a method of cloaking an acoustic wave according to an embodiment of the present invention.

Referring to FIG. 2, the method of cloaking an acoustic wave according to the present embodiment includes step S210 of mapping an acoustic propagation mathematical model for the propagation of an acoustic wave to an electromagnetic wave mathematical model for an electromagnetic wave, and step S220 of transforming the acoustic propagation mathematical model into an acoustic wave cloaking mathematical model corresponding to the electromagnetic wave mathematical model based on a correlation between the acoustic propagation mathematical model and the electromagnetic wave mathematical model.

In this case, the acoustic propagation mathematical model and the electromagnetic wave mathematical model are generalized mathematical models having time dependency, and the acoustic wave cloaking mathematical model may also be a generalized mathematical model having time dependency.

In this case, the electromagnetic wave mathematical model may be a Maxwell's equations-based mathematical model, and the acoustic wave cloaking mathematical model may be transformed from the acoustic propagation mathematical model by applying the acoustic propagation mathematical model into a Maxwell's equations-based relativistic coordinate-space transformation method.

An acoustic wave equation for the acoustic propagation mathematical model may be expressed by Equation 9 below:

$$\rho \frac{\partial \vec{v}}{\partial t} = -\vec{\nabla} p, \qquad (9)$$
$$\frac{\partial p}{\partial t} = -\lambda \vec{\nabla} \cdot \vec{v}$$

where p is pressure, $\vec{v}$ is the velocity vector of a fluid, $\rho$ is the mass of the fluid or a media, and $\lambda$ is the bulk modulus of the fluid or media.

The acoustic wave equation has a one-to-one correspondence with Maxwell's equations, i.e., the electromagnetic wave mathematical model, for specific polarization, in the case of 2D. A method for an invisibility cloak related to an electromagnetic wave may be utilized based on the above correlation.

The acoustic wave equation may be expressed for generalized curvilinear coordinates $q_1$, $q_2$, and $q_3$ by Equation 10 below:

$$\vec{\nabla} p = \hat{q}_1 \frac{1}{h_1} \frac{\partial p}{\partial q_1} + \hat{q}_2 \frac{1}{h_2} \frac{\partial p}{\partial q_2} + \hat{q}_3 \frac{1}{h_3} \frac{\partial p}{\partial q_3} \qquad (10)$$
$$\vec{\nabla} \cdot \vec{v} = \frac{1}{h_1 h_2 h_3} \left[ \frac{\partial}{\partial q_1}(v_1 h_2 h_3) + \frac{\partial}{\partial q_2}(v_2 h_3 h_1) + \frac{\partial}{\partial q_3}(v_3 h_1 h_2) \right]$$

where $\hat{q}_i$ is a unit vector (i=1, 2, 3) in a $q_i$ axis direction, and $h_i$ is a metric indicative of the distance between two points along a $q_i$ axis.

For convenience's sake, assuming that symmetry is present with respect to a z axis in 2D, the case where $q_3$=z, $h_3$=1, and $$\frac{\partial}{\partial z} = 0$$

may be contemplated. In particular, when generalized time dependency is present, the acoustic wave equation may be expressed by Equation 11 below:

$$\rho_1 \frac{\partial v_1}{\partial t} = -\frac{1}{h_1} \frac{\partial p}{\partial q_1}, \qquad (11)$$
$$\rho_1 \frac{\partial v_2}{\partial t} = -\frac{1}{h_2} \frac{\partial p}{\partial q_2},$$
$$\frac{1}{\lambda} \frac{\partial p}{\partial t} = -\frac{1}{h_1 h_2} \left[ \frac{\partial}{\partial q_1}(v_1 h_2) + \frac{\partial}{\partial q_2}(v_2 h_1) \right]$$

Furthermore, Maxwell's equations for an electromagnetic field may be expressed by Equation 12 below, and Maxwell's equations for a general vector field $\vec{F}$ may be expressed by Equation 13 below:

$$\vec{\nabla} \times \vec{E} = -\frac{\partial \vec{B}}{\partial t}, \vec{\nabla} \times \vec{H} = -\frac{\partial \vec{D}}{\partial t}, \vec{\nabla} \cdot \vec{D} = 0, \vec{\nabla} \cdot \vec{B} = 0 \qquad (12)$$

$$\vec{\nabla} \times \vec{F} = \hat{q}_1 \frac{1}{h_2 h_3} \left\{ \frac{\partial}{\partial q_2}(h_3 F_3) - \frac{\partial}{\partial q_3}(h_2 F_2) \right\} + \qquad (13)$$
$$\hat{q}_2 \frac{1}{h_3 h_1} \left\{ \frac{\partial}{\partial q_3}(h_1 F_1) - \frac{\partial}{\partial q_1}(h_3 F_3) \right\} +$$
$$\hat{q}_3 \frac{1}{h_1 h_2} \left\{ \frac{\partial}{\partial q_1}(h_2 F_2) - \frac{\partial}{\partial q_3}(h_1 F_1) \right\}$$

When Maxwell's equations are unchangeable with respect to the Z axis, they may be expressed by Equations 14 and 15 below:

$$\vec{\nabla} \times \vec{H} = \hat{q}_1 \frac{1}{h_2} \frac{\partial}{\partial q_2} H_z - \hat{q}_2 \frac{1}{h_1} \frac{\partial}{\partial q_1} H_z + \hat{z} \frac{1}{h_1 h_2} \left\{ \frac{\partial}{\partial q_1}(h_2 H_2) - \frac{\partial}{\partial q_2}(h_1 H_1) \right\} \qquad (14)$$
$$= \frac{\partial}{\partial t} \vec{D}$$
$$= \hat{q}_1 \varepsilon_1 \frac{\partial}{\partial t} E_1 + \hat{q}_2 \varepsilon_2 \frac{\partial}{\partial t} E_2 + \hat{q}_3 \varepsilon_3 \frac{\partial}{\partial t} E_3$$

$$\vec{\nabla} \times \vec{H} = \hat{q}_1 \frac{1}{h_2} \frac{\partial}{\partial q_2} E_z - \hat{q}_2 \frac{1}{h_1} \frac{\partial}{\partial q_1} E_z + \hat{z} \frac{1}{h_1 h_2} \left\{ \frac{\partial}{\partial q_1}(h_2 E_2) - \frac{\partial}{\partial q_2}(h_1 E_1) \right\} \qquad (15)$$
$$= -\frac{\partial}{\partial t} \vec{B}$$
$$= -\hat{q}_1 \mu_1 \frac{\partial}{\partial t} H_1 - \hat{q}_2 \mu_2 \frac{\partial}{\partial t} H_2 - \hat{q}_3 \mu_3 \frac{\partial}{\partial t} H_3$$

When generalized time dependency is present for transverse magnetic (TM) waves E1, E2 and Hz, Equation 16 below is obtained from Equations 14 and 15:

$$\varepsilon_1 \frac{\partial}{\partial t} E_1 = \frac{1}{h_2} \frac{\partial}{\partial q_2} H_z, \qquad (16)$$
$$\varepsilon_2 \frac{\partial}{\partial t} E_2 = -\frac{1}{h_1} \frac{\partial}{\partial q_1} H_z,$$
$$-\mu_z \frac{\partial}{\partial t} H_z = \frac{1}{h_1 h_2} \left\{ \frac{\partial}{\partial q_1} h_2 E_2 - \frac{\partial}{\partial q_2} h_1 E_1 \right\}$$

When Equation 11 is compared with Equation 16, it can be seen that when variables (acoustic propagation parameters) for the acoustic wave equation and variables (electromagnetic wave parameters) for the electromagnetic wave equation have a one-to-one correspondence, as represented by Equation 17 below, they have equivalent equation forms:

$$[p, v_1, v_2, \rho_1, \rho_2 \lambda^{-1}] \leftrightarrow [H_z, E_2, -E_1, \varepsilon_1, \varepsilon_2, \mu_z] \qquad (17)$$

The mathematical model of an acoustic wave may be converted into an acoustic wave cloaking mathematical model including a time variable and corresponding to generalized time dependency corresponding to the electromagnetic wave mathematical model by using the relation of Equation 17.

As described above, the present invention is configured to utilize the content of the papers by J. Mod. Opt. 58, 700-710 (2011), Journal of the Korean Physical Society 60, 1349-1360 (2012), JOSA B 30, 140-148 (2013), JOSA B 30, 2148 (2013), which is disclosed by the inventor of the present invention, and to apply the acoustic propagation mathematical model into the Maxwell's equations-based relativistic coordinate-space transformation method, thereby blocking an acoustic wave.

Referring back to FIG. 2, a target characteristic of the meta-material is obtained using the acoustic wave cloaking mathematical model transformed from the acoustic propagation mathematical model by applying the acoustic propagation mathematical model into the Maxwell's equations-based relativistic coordinate-space transformation method at step S230.

In this case, the target characteristic of the meta-material may include the density of a fluid, the mass of media, the bulk modulus of the fluid or media, the density of the media, or the like.

In this case, at step S230, a correspondence between the acoustic propagation parameters of the acoustic propagation mathematical model and the electromagnetic wave parameters of the electromagnetic wave mathematical model may be obtained, and the target characteristic of the meta-material may be obtained using the obtained correspondence between the acoustic propagation parameters and the electromagnetic wave parameters.

The meta-material having the target characteristic obtained at step S230 is disposed to surround a region including a target object at step S240, and thus an acoustic wave having generalized time dependency is blocked using the meta-material at step S250, thereby blocking an acoustic wave having time dependency propagating to the region including the target object or preventing an acoustic wave having time dependency, generated by the region including the target object, from propagating to the outside.

The term "target object" used herein may be based on a spatial concept, or may be an object corresponding to a noise source.

As described above, the method of cloaking an acoustic wave according to the present embodiment invention is configured to transform the acoustic propagation mathematical model into the acoustic wave cloaking mathematical model including a time variable corresponding to time dependency by applying the acoustic propagation mathematical model into the Maxwell's equations-based relativistic coordinate-space transformation method, and to obtains a target characteristic of the meta-material by using the obtained acoustic wave cloaking mathematical model, thereby blocking an acoustic wave by using the meta-material having the obtained target characteristic.

Furthermore, since the present invention uses the mathematical model having generalized time dependency, the target characteristic of the meta-material may be obtained by applying the prevent invention to an acoustic wave cloaking target region having any geometrical shape that is applied to one or more of all coordinate systems including an elliptic coordinate system, a bipolar coordinate system, a Cartesian coordinate system, a cylindrical coordinate system, a spherical coordinate system, etc.

According to the present invention, an acoustic wave cloaking device for a bipolar coordinate system and a Cartesian coordinate system will be described as an example in greater detail below.

1) Acoustic wave cloaking device for a bipolar coordinate system

Figure 3:
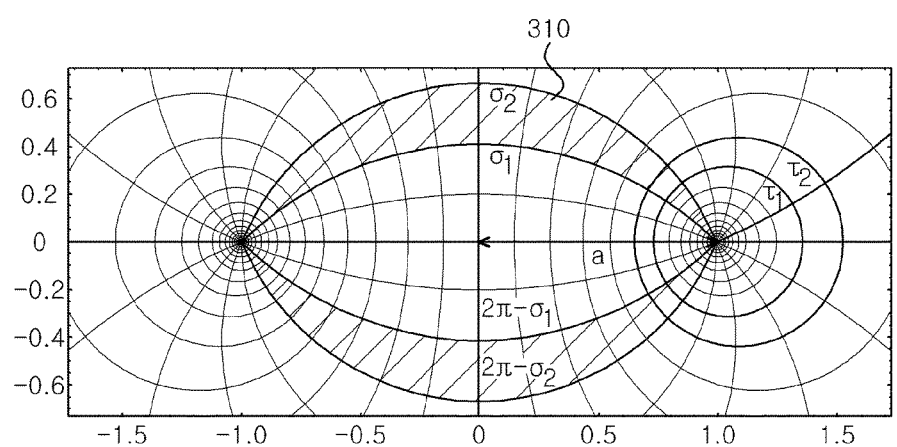
FIG. 3 shows an example of an acoustic wave cloaking device for a bipolar cylindrical coordinate system according to an embodiment of the present invention.

FIG. 3 shows an example of an acoustic wave cloaking device for a bipolar cylindrical coordinate system. The relationship between the independent variables $\sigma$, $\tau$, and z of the bipolar coordinate system and the Cartesian coordinate system x, y, and z may be expressed by Equation 18 below:

$$x = a\frac{\sinh\tau}{\cosh\tau - \cos\sigma} \quad (18)$$
$$y = a\frac{\sin\sigma}{\cosh\tau - \cos\sigma}$$
$$z = z$$

where $\sigma$ is an angle or a generalized distance in the physical space, $\tau$ is the ratio of the distance to the angle $\sigma$ at any point P in the bipolar cylindrical coordinate system in the physical space, the range of $\sigma$ is $0 \leq \sigma < 2\pi$, the range of $\tau$ is $-\infty < \tau < \infty$, the range of z is $-\infty < z < \infty$, and a may be a value larger than 0.

In the case of a bipolar cylindrical cloak, a region to which an invisibility target object belongs or a target region may be represented using a bipolar cylindrical coordinate system.

In this case, a target object or target region to be protected may be disposed in the range of $\sigma_1 < \sigma < 2\pi - \sigma_1$, and a meta-material 310 constituting an acoustic wave cloaking device may be disposed in the range of $\{\sigma_2 < \sigma < \sigma_1\} \cup \{2\pi - \sigma_1 < \sigma < 2\pi - \sigma_2\}$. In this case, $\sigma$ is an angle or a generalized distance in the physical space, and $\sigma_1$ and $\sigma_2$ are predetermined angles or generalized distances in the physical space.

Accordingly, the map of the bipolar cylindrical coordinate system may be defined by Equation 12 below:

$$\sigma = \frac{\sigma_2 - \sigma_1}{\sigma_2 - \pi}(\sigma' - \pi) + \sigma_1, \sigma' \in [\sigma_2, \pi] \quad (19)$$
$$\sigma = \frac{\sigma_2 - \sigma_1}{\sigma_2 - \pi}(\sigma' - \pi) + 2\pi - \sigma_1, \sigma' \in [\pi, 2\pi - \sigma_2]$$
$$\tau = \tau', z = z'$$

where $\sigma'$ is an angle in the virtual space, $\sigma$ is an angle in the physical space, and $\tau$ and $\tau'$ are the ratios between distances d1 and d2 with respect to angles $\sigma$ and $\sigma'$ at any one point P in the bipolar cylindrical coordinate system in the physical and virtual spaces. This can be easily understood by those skilled in the art from information about a bipolar cylindrical coordinate system (see information, such as https://en.wikipedia.org/wiki/Bipolar_coordinates and the like) and the relationship between the virtual and physical spaces of FIG. 1.

Accordingly, constitutive parameters for a bipolar cylindrical invisibility device or an invisibility cloak may be obtained as shown in Equation 13 below:

$$\varepsilon^i_j = \mu^i_j = \text{diag}\left(\frac{\sigma_2 - \sigma_1}{\sigma_2 - \pi}, \frac{\sigma_2 - \pi}{\sigma_2 - \sigma_1}, \frac{\sigma_2 - \pi}{\sigma_2 - \sigma_1}\frac{(\cos\sigma - \cosh\tau)^2}{(\cos\sigma' - \cosh\tau')^2}\right) \quad (20)$$

where $\varepsilon^i_j$ and $\mu^i_j$ are permittivity and permeability tensors in the bipolar cylindrical coordinate system.

Via the above-described Equations 17 and 20, conditions for implementing the method or device for cloaking an acoustic wave in the bipolar coordinate system may be represented by Equation 21 below:

$$\rho_\sigma = \varepsilon_\tau^\tau = \frac{\sigma_2 - \pi}{\sigma_2 - \sigma_1} \quad (21)$$

$$\rho_\tau = \varepsilon_\sigma^\sigma = \frac{\sigma_2 - \sigma_1}{\sigma_2 - \sigma_1}$$

$$\frac{1}{\lambda} = \frac{\sigma_2 - \pi}{\sigma_2 - \sigma_1} \frac{(\cos\sigma - \cosh\tau)^2}{(\cos\sigma' - \cosh\tau')^2}$$

$$p = H_z, v_\sigma = E_\tau, v_\tau = -E_\sigma$$

That is, as shown in Equation 21, it can be seen that the target characteristic of the meta-material in the bipolar coordinate system is obtained using the acoustic wave cloaking mathematical model transformed from the acoustic propagation mathematical model considering generalized time dependency.

The target region can be protected from an acoustic wave having generalized time dependency by disposing the meta-material, having the target characteristic obtained using Equation 21, to surround the target region.

Figure 4:
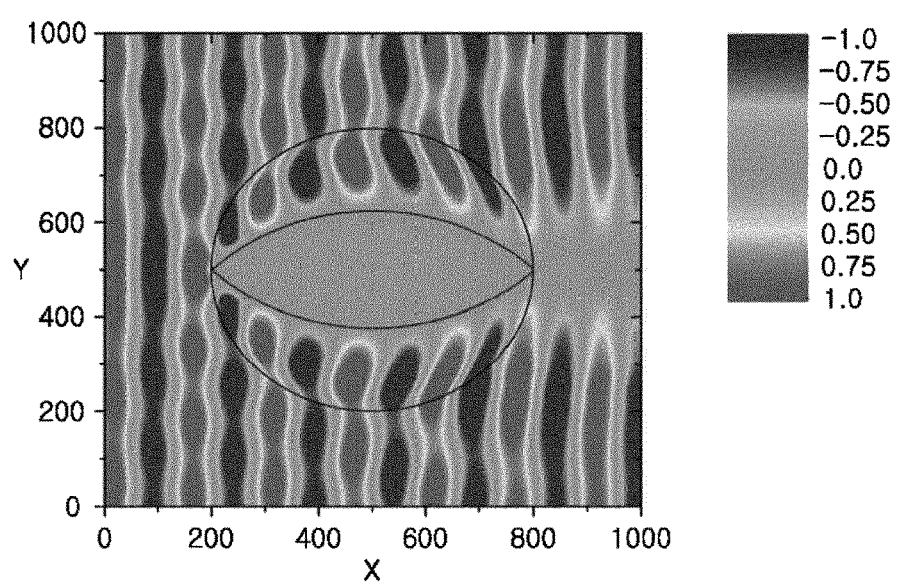
FIGS. 4 and 5 show the results of cloaking for the acoustic wave cloaking device of FIG. 3.
Figure 5:
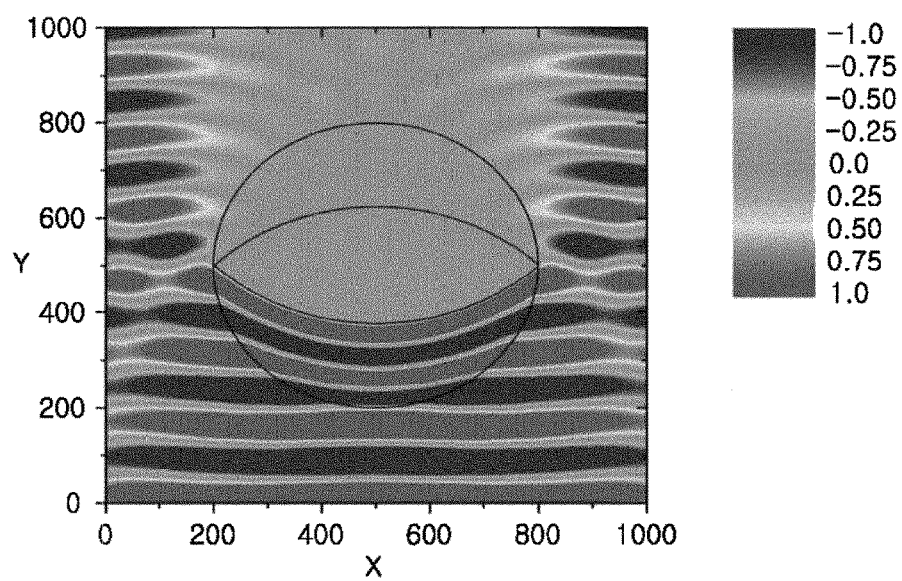

FIGS. 4 and 5 show the results of cloaking for the acoustic wave cloaking device of FIG. 3. That is, these drawings show the results of cloaking for a bipolar invisibility device mapped to a 2D σ axis by using an acoustic or pressure wave p having an operation frequency f of 1 KHz and a wavelength λ of 1.5 m. In this case, the operation frequency and the wavelength may be the operation frequency and wavelength of a low-frequency active sonar system.

In FIGS. 4 and 5, a finite-difference time-domain (FDTD) cell size of $\Delta x = \Delta y = \lambda/300$ is used, a temporal discretization step follows a Courant stability condition set to $\Delta t = \Delta d/2c_0$ (=1.67 μsec), and it is assumed that acoustic velocity in saline water is 1500 m/sec. The temporal discretization step can be easily found by those skilled in the art to which the present invention pertains via academic paper search or the like. For example, the temporal discretization step can be easily found via the paper "Electromagnetic simulation using the FDTD method" published in IEEE Press, 2000.

In this case, $c_0$ is the velocity of light in vacuum.

In FIGS. 4 and 5, for the lossless acoustic wave cloaking device mapped to the σ axis, it was assumed that an inner ellipse $\sigma_1$ was $0.75\pi$, an outer ellipse $\pi_2$ was $0.5\pi$, a semi-focal distance α was 3 m, and a rigid scatterer (RG) was present between $\sigma_1$ and $2\pi - \sigma_1$, and an acoustic or pressure wave propagated for 18,000 steps, i.e., about 3 msec.

An acoustic wave blocking function appears in the state of being mapped to line segments. The acoustic or pressure wave propagates outside the line segments of the inner ellipse of FIG. 4, as shown in FIG. 5.

As described above, from the results of numerical analysis shown in FIGS. 4 and 5, it can be seen that the acoustic or pressure wave propagating in x- and y-axis directions does not reach the inner region of a bipolar cylinder. Accordingly, when the present invention is applied, a noise source having generalized time dependency can be isolated, and an acoustic wave can be fundamentally blocked in a desired area. In principle, the present invention may be applied to the mitigation of noise between floors in an apartment building and a reduction of the noise level of a ship or a submarine.

Figure 6:
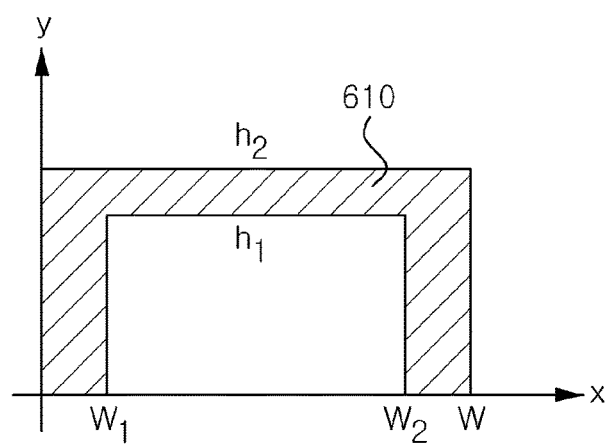
FIG. 6 shows the configuration of an acoustic wave cloaking device for a Cartesian coordinate system according to another embodiment of the present invention.

FIG. 6 shows the configuration of an acoustic wave cloaking device for a Cartesian coordinate system according to another embodiment of the present invention. This drawing shows a rectangular acoustic wave clocking structure.

As shown in FIG. 6, to block the rectangular structure from an external acoustic wave by using a meta-material 610, coordinate transformation must be performed, and the coordinate transformation may be performed as shown in Equation 22 below:

$$x = x' \quad (22)$$
$$y = h_1 + \frac{h_2 - h_1}{h_2} y'$$
$$z = z'$$

In this case, the relation of Equation 23 below may be derived from Equation 22 and the results of the paper "Calculation of Permittivity Tensors for Invisibility Devices by Effective Media Approach in General Relativity", Doyeol Ahn, Journal of Modern Optics, Volume 58, Issue 8, 2011, which was written and published on Apr. 1, 2011 by the inventor of the present invention:

$$g^{ij} = \begin{pmatrix} 1 & 0 & 0 \\ 0 & \left(\frac{h_2 - h_1}{h_2}\right)^2 & 0 \\ 0 & 0 & 1 \end{pmatrix} \quad (23)$$

$$\sqrt{\gamma} = 1$$

$$\sqrt{-g} = \frac{h_2}{h_2 - h_1}$$

$$\varepsilon^{ij} = \begin{pmatrix} \frac{h_2}{h_2 - h_1} & 0 & 0 \\ 0 & \frac{h_2 - h_1}{h_2} & 0 \\ 0 & 0 & \frac{h_2}{h_2 - h_1} \end{pmatrix}$$

That is, the target characteristic of the meta-material adapted to prevent an acoustic wave having time dependency from propagating to the rectangular structure may be obtained via Equation 24.

According to the present invention, using a meta-material having a target characteristic obtained by applying a mathematical model for the propagation of an acoustic wave including generalized time dependency into a Maxwell's equations-based relativistic coordinate-space transformation method including generalized time dependency, a specific region can be blocked from an acoustic wave having generalized time dependency, or an acoustic wave generated by a specific object can be prevented from propagating to the outside.

Furthermore, according to the present invention, a target object or a specific region can be blocked from an acoustic wave, so that a noise source can be isolated, an acoustic wave can be fundamentally blocked in a desired area, and the present invention can be applied to the mitigation of noise between floors in an apartment building and a reduction of the noise level of a ship or a submarine in principle.

According to the present invention, the characteristic of the meta-material adapted to cloak an acoustic wave can be obtained accordingly even when an acoustic wave cloaking target region has any geometrical shape that is applied to one or more of all coordinate systems including an elliptic coordinate system, a bipolar coordinate system, a Cartesian coordinate system, a cylindrical coordinate system, a spherical coordinate system, etc.

According to the present invention, the characteristic of the meta-material adapted to cloak a specific region from an acoustic wave regardless of factors, such as the frequency and velocity of the acoustic wave can be obtained.

While the present invention has been described in conjunction with specific details, such as specific elements, and limited embodiments and diagrams, above, these are provided merely to help an overall understanding of the present invention. The present invention is not limited to these embodiments, and various modifications and variations can be made based on the foregoing description by those having ordinary knowledge in the art to which the present invention pertains.

Therefore, the technical spirit of the present invention should not be determined based only on the described embodiments, and not only the following claims but also all equivalents to the claims and equivalent modifications should be construed as falling within the scope of the spirit of the present invention.

What is claimed is:

1. A method of cloaking an acoustic wave, comprising:
   transforming an acoustic propagation mathematical model, predetermined for propagation of an acoustic wave, into an acoustic wave cloaking mathematical model corresponding to an electromagnetic wave mathematical model predetermined for an electromagnetic wave and including a time variable for time dependency in a 4D coordinate system, based on a correlation between the acoustic propagation mathematical model and the electromagnetic wave mathematical model;
   obtaining a target characteristic of a meta-material by using the acoustic wave cloaking mathematical model; and
   blocking a region including a target object, from an acoustic wave by disposing the meta-material having the obtained target characteristic to surround the region,
   wherein a target characteristic of the meta-material is calculated based on a space-time meta-material analysis based on the General Theory of the Relativity,
   wherein an empty space of a physical space corresponding to the target region to be hidden with the target object is transformed into a virtual space that has a point the empty space of the physical space is transformed thereto, so that the empty space of the physical space is hidden from external acoustic waves, and
   where the transformation of the physical space into the virtual space is obtained using covariant Maxwell's equations based on the General Theory of the Relativity, and using a coordinate transformation equation according to a spatial topology of the target region and the meta-material.

2. The method of claim 1, wherein the transforming comprises obtaining a one-to-one correspondence between acoustic propagation parameters of the acoustic propagation mathematical model and electromagnetic wave parameters of the electromagnetic wave mathematical model, and transforming the acoustic propagation mathematical model into the acoustic wave cloaking mathematical model by using the one-to-one correspondence between the acoustic propagation parameters and the electromagnetic wave parameters.

3. The method of claim 1, wherein:
   the electromagnetic wave mathematical model comprises a Maxwell's equations-based mathematical model; and
   the transforming comprises transforming the acoustic propagation mathematical model into the acoustic wave cloaking mathematical model by applying the acoustic propagation mathematical model into a Maxwell's equations-based relativistic coordinate-space transformation method.

4. The method of claim 1, wherein the acoustic wave cloaking mathematical model is a mathematical model that is applicable to all coordinate systems including an elliptic coordinate system, a bipolar coordinate system, a Cartesian coordinate system, a cylindrical coordinate system, and a spherical coordinate system.

5. A device for cloaking acoustic wave by using a meta-material, wherein:
   the meta-material has a target characteristic obtained using a predetermined acoustic wave cloaking mathematical model, and is disposed to surround a target region including a target object to be blocked from an acoustic wave; and
   the acoustic wave cloaking mathematical model is determined through transformation of an acoustic propagation mathematical model predetermined for propagation of an acoustic wave in accordance with an electromagnetic wave mathematical model predetermined for an electromagnetic wave based on a correlation between the acoustic propagation mathematical model and the electromagnetic wave mathematical model, and includes a time variable for time dependency in a 4D coordinate system,
   wherein a target characteristic of the meta-material is calculated based on a space-time meta-material analysis based on the General Theory of the Relativity,
   wherein an empty space of a physical space corresponding to the target region to be hidden with the target object is transformed into a virtual space that has a point the empty space of the physical space is transformed thereto, so that the empty space of the physical space is hidden from external acoustic waves, and
   where the transformation of the physical space into the virtual space is obtained using covariant Maxwell's equations based on the General Theory of the Relativity, and using a coordinate transformation equation according to a spatial topology of the target region and the meta-material.

6. The device of claim 5, wherein the acoustic wave cloaking mathematical model is transformed from the acoustic propagation mathematical model by using a one-to-one correspondence between acoustic propagation parameters of the acoustic propagation mathematical model and electromagnetic wave parameters of the electromagnetic wave mathematical model obtained based on the correlation between the acoustic propagation mathematical model and the electromagnetic wave mathematical model.

7. The device of claim 5, wherein:
   the electromagnetic wave mathematical model comprises a Maxwell's equations-based mathematical model; and
   the acoustic wave cloaking mathematical model is determined through the transformation of the acoustic propagation mathematical model by applying the acoustic propagation mathematical model into a Maxwell's equations-based relativistic coordinate-space transformation method.

8. The device of claim 5, wherein the acoustic wave cloaking mathematical model is a mathematical model that is applicable to all coordinate systems including an elliptic coordinate system, a bipolar coordinate system, a Cartesian coordinate system, a cylindrical coordinate system, and a spherical coordinate system.

* * * * *